(12) United States Patent
Kim

(10) Patent No.: US 6,597,101 B2
(45) Date of Patent: Jul. 22, 2003

(54) ELECTRON GUN FOR COLOR CATHODE-RAY TUBE

(75) Inventor: Sun Won Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/899,949

(22) Filed: Jul. 9, 2001

(65) Prior Publication Data

US 2002/0033662 A1 Mar. 21, 2002

(30) Foreign Application Priority Data

Aug. 3, 2000 (KR) .......................... 2000-45050

(51) Int. Cl.[7] ................................. H01J 29/00
(52) U.S. Cl. ................................. 313/477 HC
(58) Field of Search .................. 313/477 HC, 331, 313/332

(56) References Cited

FOREIGN PATENT DOCUMENTS

JP 07154630 A * 6/1995 ........... B23K/11/00

* cited by examiner

Primary Examiner—Sandra O'Shea
Assistant Examiner—Sumati Krishnan
(74) Attorney, Agent, or Firm—Fleshner & Kim, LLP

(57) ABSTRACT

An electron gun for a cathode-ray tube having a neck glass formed at a rear side of a funnel, a stem pin applying an external voltage to an electron gun, a cathode electrode generating electron beams, a plurality of grid electrodes installed spaced apart from the electrode at predetermined intervals and each focusing electrode receiving a static voltage or a dynamic voltage, and an electron gun having an anode installed isolated from the focusing electrode, the electron gun being encapsulated in the neck glass, wherein a wire connecting the stem pin and the dynamic static voltage focusing electrode is formed to have a regular section change in a longitudinal direction, to thereby change a natural frequency. The dynamic voltage focusing electrode and the stem pin are connected and the wire for applying the dynamic voltage is formed to a twisted several-strand wires to thereby improve the damping coefficient. Accordingly, the neck glass is restrained from vibrating and the noise is canceled. In addition, since the natural frequency of the wire is varied by twisting the wire or changing the section regularly in the longitudinal direction, a vibration of a specific frequency may not be transmitted to resonate the neck glass, so that the neck glass is prevented from vibrating and the noise is reduced, thereby improving the sensitivity characteristic of the color cathode-ray tube.

11 Claims, 5 Drawing Sheets

| NOISE OCCURRENCE FREQUENCY / NOISE LEVEL | 8 | 8' | 800 |
|---|---|---|---|
| ABOVE 50dB | 13 TIMES | 7 TIMES | 3 TIMES |
| ABOVE 40dB | 37 TIMES | 26.33 TIMES | 18 TIMES |

ELECTRON GUN FOR COLOR CATHODE-RAY TUBE

BACKGROUND OF THE INVENTION

1 Field of the Invention

The present invention relates to a color cathode-ray tube, and more particularly, to a wire structure in which a natural frequency of a wire itself and a vibration damping force are improved to prevent a vibration of a neck glass caused due to an electrostatic force between the neck glass and a dynamic voltage focusing electrode.

2. Description of the Background Art

Generally, as shown in FIG. 1, a color cathode-ray tube includes a bulb-shaped funnel 1, a panel 2 with a fluorescent material coated on the inner surface thereof and being attached on the front surface of the funnel, an electron gun 4 encapsulated in a neck glass 3 formed at a rear side of the funnel 1, a stem pin 15 installed at the rear side of the neck glass 3, for applying a power to the electron gun 4, and a deflection yoke 5 installed at an outer periphery of the front side of the electron gun 4, that is, at an outer periphery of the rear side of the funnel 1.

In the color cathode-ray tube having the above-described structure, when a power is applied through the stem pin 15 to the electron gun 4, an electron beam is focused and accelerated to be injected toward the panel 2. At this time, an injection position of the electron beam is adjusted by the deflection yoke 5 to emit the fluorescent material coated on the inner surface of the panel 2.

The construction of the electron gun 4 for generating electron beams will now be described in detail with reference to FIGS. 2 and 3.

The stem portion is fused with the neck glass and sealed so that it may receive a voltage from an external source as being inserted inside the neck glass 3 at the rear side of the funnel 1, and a plurality of terminals are installed at the stem portion to make a stem pin 15.

A heater 41 is disposed connected to the stem pin 15. A cathode 42 is positioned at the front side of the heater 41. A first grid electrode 43 is disposed forwardly at a distance from the cathode 42. A second grid electrode 44, a third grid electrode 45 and a fourth grid electrode 46 are sequentially installed spaced apart from the first grid electrode 43. A static voltage focusing electrode 47, a dynamic voltage focusing electrode 48 and an anode 49 are disposed forwardly spaced apart from the fourth grid electrode 46.

Lower portions of each electrode are fixed to a bead glass 9 so that each electrode can be maintained at certain intervals, and a shield tap 7 is positioned in the middle of the upper and the lower faces of the bead glass 9.

A shield cup 14 for shielding a leakage magnetic field is installed at the end of the front side of the anode 49, and a bulb space connector (BSC) 50 for supporting the electron gun is connected at the front side of the shield cup 14.

Generally, in order to improve an image quality of a color cathode-ray tube, a dynamic voltage current is applied to one of the focusing electrodes 47 and 48 of the electron gun 4 and a static voltage current is applied to the other, or a dynamic voltage current is applied to at least two grid electrodes.

Thus, in order for the dynamic voltage current to be applied to the focusing electrodes 47 and 48, a wire 8 is connected between the stem pin 15 and the dynamic voltage focusing electrode 48. As shown in FIG. 4, the wire 8 is made of one-strand metal of which a rear end portion or a central portion is bent to rest on the upper surface of the bead glass 9.

In the conventional electron gun, as the heater 41 is heated upon receipt of the static voltage current through the stem pin 15, electron beams are injected from the cathode 42. The electron beams are controlled by the first grid electrode 43 and accelerated by the second grid electrode 44.

After being controlled and accelerated, the electron beams are focused and accelerated by a potential difference between the dynamic voltage applied to the dynamic voltage focusing electrode 48 and the constant-voltage applied to the static voltage focusing electrode 47, which passes through a slot of a shadow mask so as to be color-sorted and land on the fluorescent material coated on the inner surface of the panel 2 to emit the fluorescent material.

However, in the conventional electron gun, due to the dynamic voltage applied to the dynamic voltage focusing electrode 48 intended initially to improve the image quality, a large amount of dynamic voltage is induced at each point outside the neck glass 3.

At this time, the voltage applied to the electrode is defined by the following equation [1].

$$V = V_{DC} + V_{AC\ cos\ \omega t} \quad [1]$$

wherein $V_{DC}$ indicates a static voltage applied to the cathode, the heater, the first, the second and the third grid electrodes or the like of the electron gun, $V_{AC\ cos\ \omega t}$ indicates a dynamic voltage applied to the dynamic voltage focusing electrode, 'V' indicates a voltage applied to the electrode, ω indicates an angular frequency, and 't' indicates time.

Accordingly, an electrostatic force is generated between the neck glass and the dynamic voltage focusing electrode as obtained in the following equation [2].

$$F(t) = (\sigma_b/2\varepsilon_0)CV_{DC} + (1/2)(dC/dZ)\{V_{DC}^2 + (1/2)V_{AC}^2\} + \quad [2]$$
$$(\sigma_b/2\varepsilon_0)DV_{AC\cos\omega t} + (dC/dZ)V_{DC}V_{AC\cos\omega t} +$$
$$(1/4)(dC/dZ)V_{AC\cos 2\omega t}^2$$

wherein F(t) indicates an electrostatic force, $\sigma_b$ indicates a surface charge density, $\varepsilon_0$ indicates a dielectric constant in vacuum, and 'C' indicates an electrostatic capacity between the neck glass and the focusing electrode to which a dynamic voltage is applied.

When such a force is at work, the force according to third, fourth and fifth items of the above equation (2), not the static voltage, shows changes of $cos\ \omega t$. When it is simplified, the electrostatic force can be expressed by the following equation [3].

$$F(t) = \varepsilon_0 \cdot S \cdot (dV)^2/(2D^2) \quad [3]$$

That is, dV indicates a potential difference between electrodes, 'D' indicates a distance between the electrodes, 'S' indicates a facing area between the electrodes.

The electrostatic force vibrates the dynamic voltage focusing electrode 48, and the vibration of the dynamic voltage focusing electrode 48 is transmitted along the wire 8 to the stem pin 15 connected to the wire 8, to vibrate the neck glass 8.

Meanwhile, even though the dynamic voltage focusing electrode 48 is not vibrated by the electrostatic force, the wire 8 is vibrated owing to the change of the static electricity generated between the neck glass 3 and the dynamic voltage focusing electrode 48. This vibration makes the neck glass 3 vibrate, causing increased noise.

In addition, the vibration transmitted from the dynamic voltage focusing electrode 48 or the vibration occurring in the wire 8 generates a resonance if it is identical to the natural frequency of the neck glass 3, causing a high frequency noise which degrades the sensitivity characteristics of the cathode-ray tube.

SUMMARY OF THE INVENTION

Therefore, an object of the present invention is to provide an electron gun for a color cathode-ray tube in which a wire structure and form connected to apply a current to a focusing electrode are changed to vary a natural frequency of a wire and a vibration is prevented from being transmitted to a neck glass by improving a vibration damping capability, thereby restraining occurrence of a high frequency noise.

To achieve these and other advantages and in accordance with the purpose of the present invention, as embodied and broadly described herein, there is provided an electron gun for a cathode-ray tube having a neck glass formed at a rear side of a funnel, a stem pin applying an external voltage to an electron gun, a cathode electrode generating electron beams, a plurality of grid electrodes installed spaced apart from the electrode at predetermined intervals and each focusing electrode receiving a static voltage or a dynamic voltage, and an electron gun having an anode installed isolated from the focusing electrode, the electron gun being encapsulated in the neck glass, wherein a wire connecting the stem pin and the dynamic static voltage focusing electrode is formed to have a regular section change in a longitudinal direction, to thereby change a natural frequency.

For this purpose, several-strand wires are formed twisted together.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
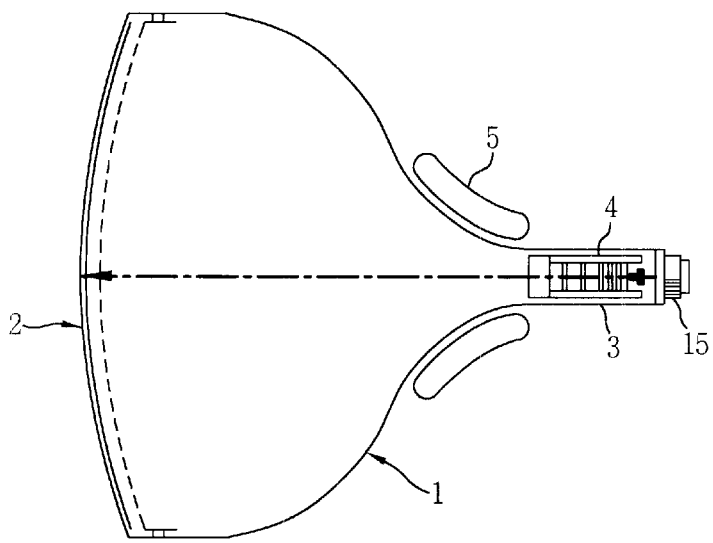
FIG. 1 is a schematic sectional view showing a general color cathode-ray tube in accordance with a conventional art.
Figure 2:
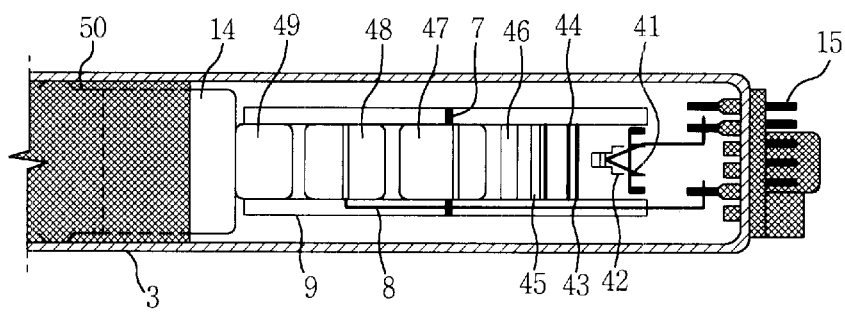
FIG. 2 is a side sectional view of an electron gun encapsulated in a neck portion of the color cathode-ray tube in accordance with the conventional art.
Figure 3:
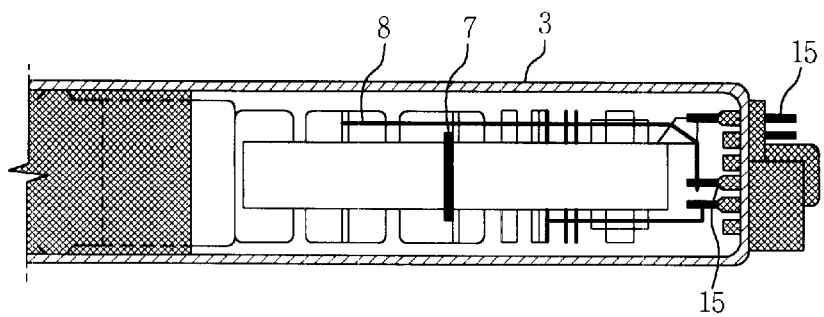
FIG. 3 is a sectional view of a lower portion of the electron gun encapsulated in a neck portion of the color cathode-ray tube in accordance with the conventional art.
Figure 4:
FIG. 4 is a sectional view of a wire installed in the color cathode-ray tube in accordance with the conventional art.
Figure 5:
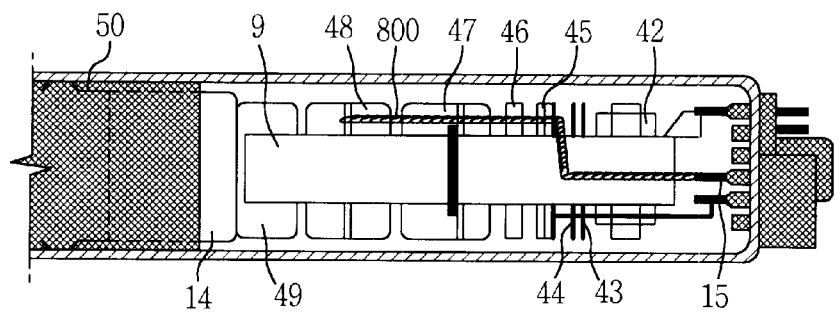
FIG. 5 is a schematic sectional view of a lower portion of a neck portion in which the electron gun is sealed of the color cathode-ray tube in accordance with a preferred embodiment of the present invention.
Figure 6:
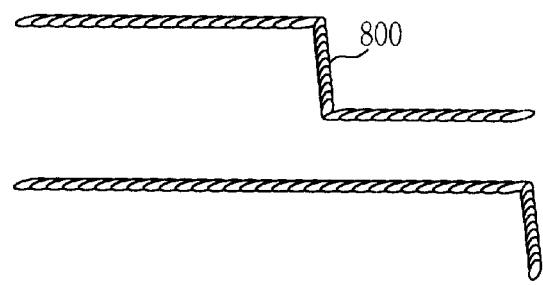
FIG. 6 is a sectional view of a twist-type wire for use in an electron gun of a color cathode-ray tube in accordance with a first embodiment of the present invention.
Figure 7:
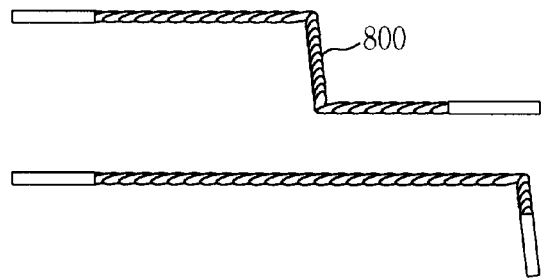
FIG. 7 is a sectional view of a twist-type wire of which both ends are integrally formed in accordance with a second embodiment of the present invention.
Figure 8:
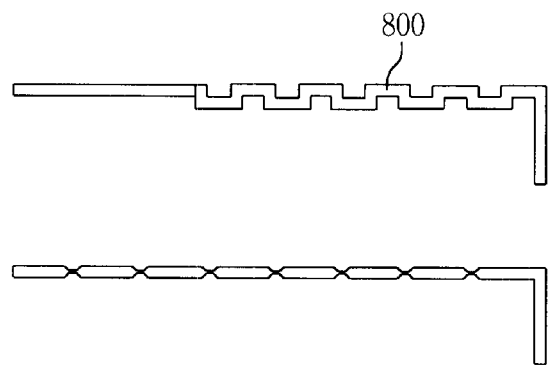
FIG. 8 is a sectional view of a concavo-convex wire in accordance with a third embodiment of the present invention.
Figure 9:
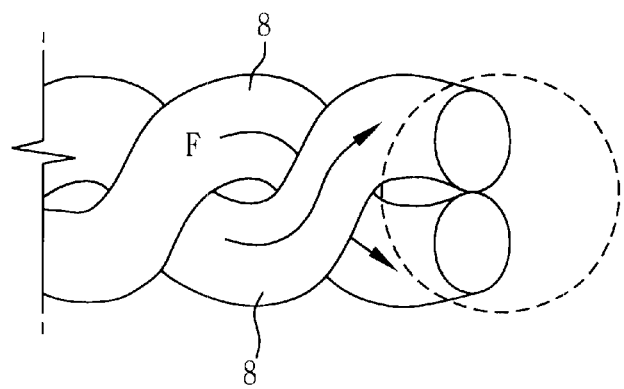
FIGS. 9 and 10 are drawings illustrating a dynamic relationship of the wire in accordance with the preferred embodiment of the present invention.
Figure 10:
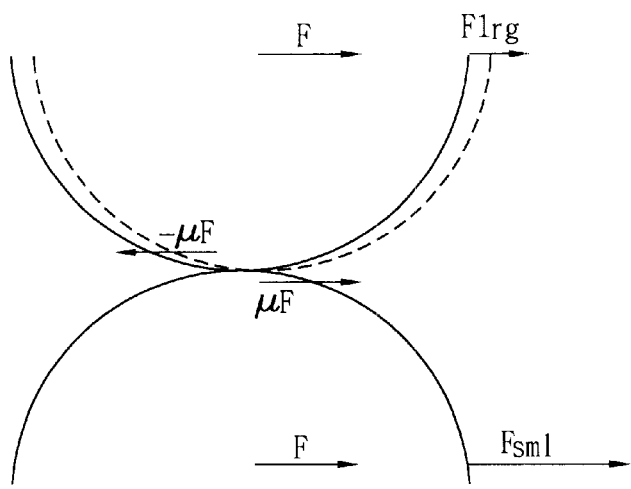

FIG. 5 is a schematic sectional view of a lower portion of a neck portion in which the electron gun is sealed of the color cathode-ray tube in accordance with a preferred embodiment of the present invention, FIG. 6 is a sectional view of a twist-type wire for use in an electron gun of a color cathode-ray tube in accordance with a first embodiment of the present invention, FIG. 7 is a sectional view of a twist-type wire of which both ends are integrally formed in accordance with a second embodiment of the present invention, FIG. 8 is a sectional view of a concavo-convex wire in accordance with a third embodiment of the present invention; and FIGS. 9 and 10 are drawings illustrating a dynamic relationship of the wire in accordance with the preferred embodiment of the present invention.

Figure 11:
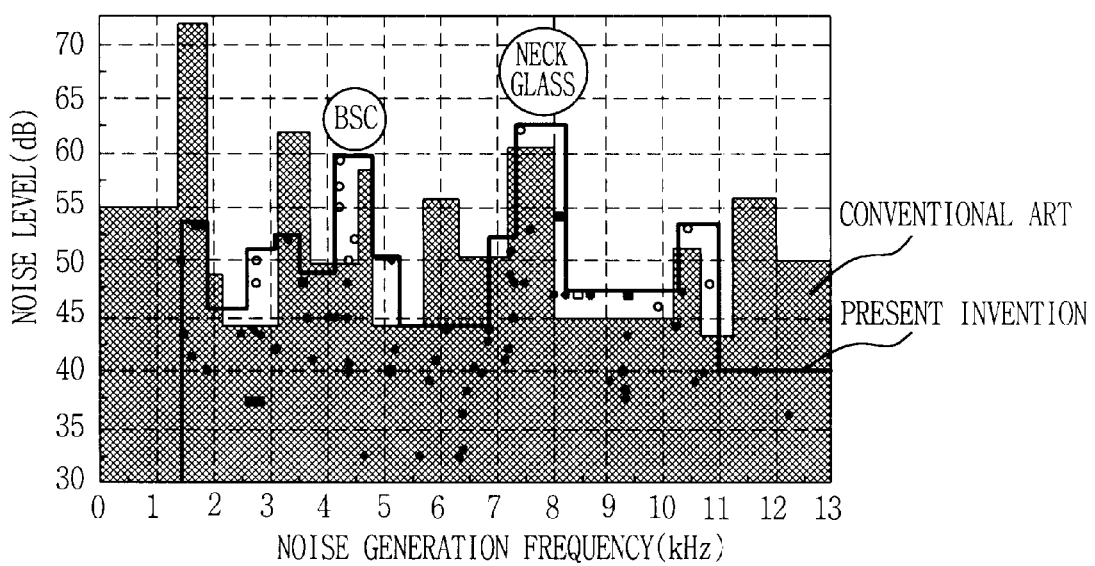
FIG. 11 is a graph comparatively showing results of measurement of a noise generated from a conventional neck glass and a noise generated from of a neck glass of the preferred embodiment of the present invention.
Figures 12, 13:
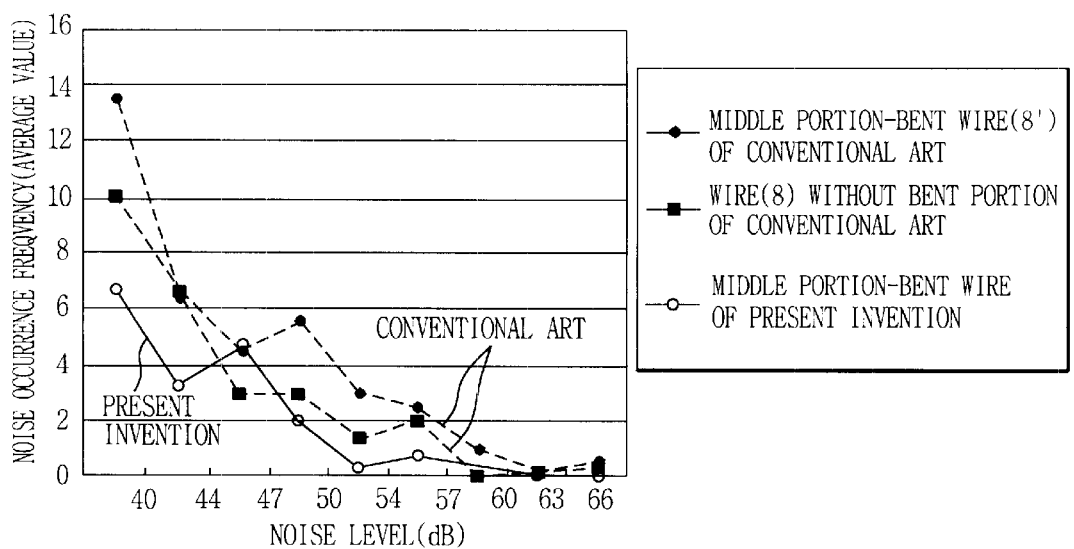
FIG. 12 is a graph comparatively showing levels of a noise of a middle portion-bent wire or a wire without a bent portion of the conventional art and a level of a noise of a twist-type wire in accordance with the preferred embodiment of the present invention.
FIG. 13 is a table showing an occurrence frequency of a noise generated from the conventional wire and a noise generated from the color-cathode-ray tube employing the wire in accordance with the preferred embodiment of the present invention.

And, FIG. 11 is a graph comparatively showing results of measurement of a noise generated from a conventional neck glass and a noise generated from of a neck glass of the preferred embodiment of the present invention, FIG. 12 is a graph comparatively showing levels of a noise of the conventional wire with its middle portion bent or without bent portion and a level of a noise of a twist-type wire in accordance with the preferred embodiment of the present invention; and FIG. 13 is a table showing an occurrence frequency of a noise generated from the conventional wire and a noise generated from the color-cathode-ray tube employing the wire in accordance with the preferred embodiment of the present invention.

With reference to FIG. 5, in order to support an electron gun 4 encapsulated in the neck portion of the color cathode-ray tube, a bulb space connector (BSC) 50 is installed at a front side of a neck glass unit 3. A shield cup 14 for shielding a leakage magnetic field is installed at a rear side of the BSC 50 50 that a path of electron beams may not be messed up.

A bead glass 9 is positioned at a rear side of the shield cup 14 at which electrodes of the electron gun are fixed at certain intervals, and a protrusive stem pin 15 is installed protruded to apply a voltage of an external source to the various electrodes installed at upper and lower portions of the bead glass 9.

From the front side to the back side at the bead glass 9, there are sequentially disposed a cathode electrode 42 installed adjacent to the heater for generating a heat upon receipt of an electrostatic power from the stem pin 15, the first grid electrode 43 spaced apart from the cathode electrode 42 and the second, the third and the fourth grid electrodes 44, 45 and 46 spaced apart from the first grid electrode.

And, a static voltage focusing electrode 47 and a dynamic voltage focusing electrode 48 to which a static voltage or a dynamic voltage is applied are sequentially arranged spaced apart from the fourth grid electrode 46, and an anode electrode 49 is positioned spaced apart from the dynamic voltage focusing electrode 48.

Especially, a wire 800 that several-strand wires are twisted together is installed between the dynamic voltage focusing electrode 48 and the stem pin 15 to apply the dynamic voltage to the dynamic voltage focusing electrode 48. The static voltage is applied to the first and the second grid electrodes 43 and 44, the dynamic voltage is applied to the third grid electrode 45, and the static voltage is applied to the fourth grid electrode 46.

That is, the dynamic voltage, which is varied according to a deflection current of a deflection yoke, is applied to the third grid electrode 45 and the dynamic voltage focusing electrode 48.

The operation of the color cathode-ray tube of the present invention having the construction as described above will now be described.

When an accelerated electric field is applied from an external source, electron beams are generated from the cathode electrode 42, which then passes through the first and the second grid electrodes, so as to be controlled and focused.

And then, the electron beams are focused and accelerated by potential difference between the dynamic voltage applied to the third electrode 45 and the static voltage applied to the fourth electrode 46, which are color-sorted while passing the slot of the shadow mask, and landed on the fluorescent material coated on the inner surface of the panel to emit the fluorescent material.

However, the dynamic voltage, which is varied in the cycle of cos ωt by the deflection current of the deflection yoke, as well as the static voltage is also induced to the neck glass in inserting the electron gun, so that the electrostatic force is changed between the dynamic voltage focusing electrode and the neck glass.

According to the change in the electrostatic force, the wire 800 is vibrated, but the vibration is damped thanks to the following construction.

In a first embodiment of the present invention, the wire 800 formed by twisting several-strand wires together is, as shown in FIG. 6, perpendicularly bent at its middle portions by two times or a part of its end portion is bent.

In a second embodiment of the present invention, as shown in FIG. 7, the wire 800 is formed in the same manner as that of the first embodiment only except that both ends are integrally formed, rather than being twined together, for easy welding, The middle portion of the wire is bent twice and its end portion is bent.

In a third embodiment of the present invention, as shown in FIG. 8, the wire 800 is formed such that its middle portion is bent for several times, or the thickness of the wire is formed different in the longitudinal direction.

That is, the wire 800 is successively bent in the downward direction, in the longitudinal direction and in the upward direction, or contracted portions with a reduced diameter are formed at certain intervals in the longitudinal direction.

The wire is bent to be installed at the upper surface of the bead glass so that it can avoid a dark current.

The damping effect of the wire shown in FIGS. 6 and 7 will now be described with reference to FIGS. 9 and 10.

When a vibration (F) of the focusing electrode according to the electrostatic force is transmitted to the twist-type wire 800 having a different amplitude, in case of a wire having a great amplitude, a force formed at the wire by the vibration (F) is $F_{lrg}=F-uF$, and thus, the force forming a vibration to the wire is reduced.

Meanwhile, in case of a wire which has a small amplitude, a force formed at the wire by the vibration (F), an energy, is $F_{sml}=F-uF$, and thus, the force forming a vibration to the wire becomes strong.

The reason for this is that since the wires are twined with each other, each outer circumferential surface rubs together, so that the force of the vibration formed at the wire having a great amplitude according to the frictional force uF between the wires is reduced, and accordingly, the vibration of the wire having a great amplitude is damped.

Unlikely, in case that the amplitude of the wire vibrated by $F_{sml}$ becomes greater than the amplitude of the wire vibrated by $F_{lrg}$, a force applied to the wire is $F_{sml}=F-uF$, so that the vibration is damped.

Accordingly, as the wire is formed by twining several strand wires together, friction and collision are made between wires, discharging a vibration energy as a heat energy. Thus, the vibration is damped and the vibration transmitted from the focusing electrode is mutually offset owing to the collision generated between the wires.

In addition, as the several-strand wires are twisted together, a damping coefficient of the wire becomes great, so that a vibration less than the vibration energy of the initial focusing electrode is transmitted to the neck glass, and thus, the noise at the neck glass is reduced.

Namely, the vibration generation amount of the wire to which the dynamic voltage is applied is reduced by increasing the damping coefficient or the natural frequency rate is adjusted not to be close to '1', so that less vibration can be transmitted to the neck glass.

The wire 800 as shown in FIG. 8 has such a form that a natural frequency of the neck glass and a transmitted frequency are not identical to each other, to cut off a vibration of a specific frequency generated and transmitted from the focusing electrode to which the dynamic voltage is applied.

In this respect, since the natural frequency of a wire made of a single material is in inverse proportion to mass, the natural frequency of the wire having a different diameter and thickness in the longitudinal direction is varied in the longitudinal direction, and thus, it is difficult to generate the same natural frequency as that of the neck glass.

A noise generation amount and a vibration generation amount of the neck glass of the preferred embodiment of the present invention will now be described by comparing the wire of the present invention and that of the conventional art.

Among wires of the conventional art, to which the dynamic voltage is applied, the wire 8 without a bent portion has a natural frequency of 786 Hzs, 1.2, 1.8, 3.3, 5.9, 6.2, 6.6 - - - 10.3 KHz, the middle portion-bent wire 8' has a natural frequency of 650 Hz, 1.5, 3.0, 3.7, 4.0 - - - 10.3 KHz, and the neck glass has a natural frequency of 1.2, 6.7, 7.6, 10.0, 10.5 KHz.

Generally, a frequency signal is formed by integer times of the natural frequency. Thus, an excitation of a resonance is generated even by the integer times of an input signal frequency as well as by the frequency of the input signal. At this time, the integer-times is typically below 5.

Accordingly, in case of the wire 8 without bent portion, the neck glass is resonated by 1.2 KHz, while, in case of the wire without bent portion, in case of two times, the 650 KHz natural frequency is similar to the neck glass at a 1.3 KHz, and the remaining cases are also almost the same, resulting in resonating the neck glass which causes a noise.

In other words, referring to the conventional cathode-ray tube adopting the wire to which the dynamic voltage is applied, in case of the bent wire 8, compared to the case of the non-bent wire, several frequencies are similar to the natural frequency of the neck glass, so that resonance can be easily made.

Thus, with respect to the frequent occurrence of the noise, FIG. 11 shows a graph according to an experiment to measure a noise generated at a color cathode-ray tube in case that three-strand wires 800 are twisted together to increase its damping coefficient and its middle portion is bent.

Experimental condition was that a dynamic voltage of a sinusoidal wave form is applied to the focusing electrode by using a signal generator, a generated noise was measured by using a microphone while sequentially raising the dynamic voltage from 0 Hz to 13 Hz, and then a frequency component of the generated noise was analyzed through a fast fourier transform analysis by using a frequency analyzing equipment.

On the graph, the black region represents a noise generated from the color cathode-ray tube when the conventional middle-bent wire 8' was adopted, while the thick solid line indicates a noise generated when the three-strand wires with its middle portion bent to apply the dynamic voltage is adopted. The internal black points are measured values.

Referring to the graph as shown in FIG. 11, when the wire 800 in accordance with the preferred embodiment of the present invention is applied, the noise of 4.5 KHz, 7.6 KHz and 10.5 KHz components remain as it is, but the 4.5 KHz and 10.5 KHz components of the frequencies of the generated noise are vibration components transmitted through the BSC attached on the shield cup to support the electron gun, which won't be canceled by the wire which applies the dynamic voltage.

In addition, the noise of 7.6 KHz component is generated as the neck glass itself is vibrated according to the change in the electrostatic force at the side facing the focusing electrode to which the dynamic voltage. This noise won't be canceled by the wire, too.

However, turning to the general noise occurrence distribution, a high level noise greatly affecting the sensitivity characteristic, that is, a noise higher than 65 kB was completely canceled and the level of the generated noise was lowered down on the whole.

FIG. 12 is a graph showing levels of a noise which is generated from the wire 8 without a bent portion, a middle portion-bent wire 8' of the conventional art and the twisted wire 800, and FIG. 13 is a table showing a noise occurrence frequency.

It is noted that the noise occurrence frequency, indicated by the solid line, of the color cathode-ray tube with the wire 800 installed and a noise level were reduced.

In detail, as to the frequency of a frequency that a noise of more than 50 dB or a noise of more than 40 dB is generated as shown in FIG. 13, in case of the conventional middle-portion bent wire 8', a noise of 50 dB occurred 13 times, while, in case of the wire 800 of the present invention, a noise of more than 50 dB occurred only 3 times. In addition, in case of the conventional middle-portion bent wire 8', a noise of more than 40 dB occurred 37 times, while, in case of the wire 800 of the present invention, a noise of 40 dB occurred 18 times on average.

As a result, notably, the color cathode-ray tube adopting the twisted wire with its middle portion bent has the reduced noise.

Meanwhile, in the preferred embodiment of the present invention, in order to improve an image quality of the color cathode-ray tube, the dynamic voltage focusing electrode is divided into more than two ones to have a different focusing strength according to a position of a screen, so that the electrostatic force formed between the focusing electrode and the neck glass can be lowered down.

As so far described, according to the electron gun for a color cathode-ray tube of the present invention, the dynamic voltage focusing electrode and the stem pin are connected and the wire for applying the dynamic voltage is formed to a twisted several-strand wires to thereby improve the damping coefficient. Accordingly, the neck glass is restrained from vibrating and the noise is canceled.

In addition, since the natural frequency of the wire is varied by twisting the wire or changing the section regularly in the longitudinal direction, a vibration of a specific frequency may not be transmitted to resonate the neck glass, so that the neck glass is prevented from vibrating and the noise is reduced, thereby improving the sensitivity characteristic of the color cathode-ray tube.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An electron gun assembly for a cathode-ray tube having a neck glass formed at a rear side of a funnel, an electrode gun encapsulated in the neck glass, a stem pin for applying an external voltage to the electron gun, a cathode for generating electron beams, a plurality of grid electrodes installed spaced apart at predetermined intervals, and a plurality of focusing electrodes, each focusing electrode receiving a static voltage or a dynamic voltage, the electron gun having an anode installed isolated from the focusing electrodes, the electron gun assembly comprising:

a wire for connecting the stem pin and the dynamic static voltage focusing electrode formed to have a regular section change in a longitudinal direction, to thereby change a natural frequency of the wire.

2. The electron gun assembly of claim 1, wherein the wire is formed in a concave-convex shape.

3. The electron gun assembly of claim 1, wherein the wire includes contracted portions having a reduced diameter formed at certain intervals in the longitudinal direction.

4. A cathode-ray tube comprising the electron gun assembly of claim 1.

5. The electron gun assembly of claim 1, wherein the wire comprises a plurality of twisted strands of wire.

6. The electron gun assembly of claim 5, wherein each strand of wire has a different amplitude.

7. The electron gun assembly of claim 5, wherein an end portion of the wire is formed as a single wire.

8. An electron gun assembly for a cathode-ray tube having a neck glass formed at a rear side of a funnel, an electron gun encapsulated in the neck glass, a stem pin for applying an external voltage to the electron gun, a cathode for generating electron beams, a plurality of grid electrodes installed spaced apart at predetermined intervals, and a plurality of focusing electrodes, each focusing electrode receiving a static voltage or a dynamic voltage, the electron gun having an anode installed isolated from the focusing electrodes, the electron gun assembly comprising:

a wire for connecting the stem pin and the dynamic static voltage focusing electrode formed of several twisted strands of wire.

9. The electron gun assembly of claim 8, wherein an end portion of the wire is formed as a single wire.

10. The electron gun assembly of claim 8, wherein each strand of wire has a different amplitude.

11. A cathode-ray tube comprising the electron gun assembly of claim 8.

* * * * *